(12) United States Patent
Takita

(10) Patent No.: US 7,613,394 B2
(45) Date of Patent: Nov. 3, 2009

(54) OPTICAL SWITCHING DEVICE

(75) Inventor: Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 11/438,445

(22) Filed: May 23, 2006

(65) Prior Publication Data

US 2007/0196107 A1 Aug. 23, 2007

(30) Foreign Application Priority Data

Feb. 17, 2006 (JP) ............................. 2006-040201

(51) Int. Cl.
*H04J 14/00* (2006.01)
(52) U.S. Cl. ............................. 398/45; 398/46; 398/48
(58) Field of Classification Search .................. 398/45, 398/46, 48, 50–56
See application file for complete search history.

(56) References Cited

U.S. PATENT DOCUMENTS

| 5,974,216 | A | 10/1999 | Nakaya | |
|---|---|---|---|---|
| 6,765,724 | B1 | 7/2004 | Kramer | |
| 2001/0040711 | A1* | 11/2001 | Al-Salameh et al. | 359/128 |
| 2002/0114556 | A1 | 8/2002 | Kato et al. | |
| 2004/0151497 | A1* | 8/2004 | Lee et al. | 398/45 |
| 2006/0222289 | A1* | 10/2006 | Takita et al. | 385/17 |

FOREIGN PATENT DOCUMENTS

| JP | 1990-61529 | 3/1990 |
|---|---|---|
| JP | 1995-212315 | 8/1995 |
| JP | 1998-228007 | 8/1998 |
| JP | 1998/228007 | 8/1998 |
| JP | 2000-114629 | 4/2000 |
| JP | 2000-269892 | 9/2000 |
| JP | 2001-13006 | 1/2001 |
| JP | 2001-013066 | 1/2001 |

(Continued)

OTHER PUBLICATIONS

D.M. Marom Wavelength Selective 1×K Switching System.

(Continued)

*Primary Examiner*—Dzung D Tran
(74) *Attorney, Agent, or Firm*—Fujitsu Patent Center

(57) ABSTRACT

In the present optical switching device, a reference light of a wavelength same as or in the vicinity of a wavelength of a signal light, is given from a wavelength-variable light source via each output side optical circulator to each pertinent output light path, and is propagated through each of the output light paths in a direction inverse to a propagation direction of the signal light, and passes through each optical amplifier to be sent to an optical switch module. Then, the power of the reference light which is led to each input side optical circulator from each input light path in accordance with the optical route setting by the optical switch module, is monitored by a reference light power monitor, and loss data is acquired by a control circuit using the monitoring result, so that the optical switch module is controlled in accordance with a control parameter corrected based on the loss data. Thus, it becomes possible to grasp accurately a loss characteristic of the optical switch module to perform the setting and switching of optical routes, and also, to compensate for a loss in the optical switch module while suppressing the waveform degradation of an output signal light to the minimum.

12 Claims, 7 Drawing Sheets

| | FOREIGN PATENT DOCUMENTS | |
|----|----|----|
| JP | 2002/318398 | 10/2002 |
| JP | 2002-318398 | 10/2002 |
| JP | 2003-185984 | 7/2003 |
| WO | WO 00/75710 A2 | 12/2000 |
| WO | WO 03/036344 A2 | 5/2003 |

OTHER PUBLICATIONS

Extended European Search Report, Jan. 25, 2007, Application No. 06010955.0-2216.

* cited by examiner

CONFIGURATION EXAMPLE
OF CONVENTIONAL OPTICAL SWITCH MODULE

OPTICAL SWITCHING DEVICE

BACKGROUND OF THE INVENTION

1. Field of the Invention

The present invention relates to an optical switching device for performing the setting and switching of optical routes between a plurality of input and output ports, and in particular, to an optical switching device suitable for the use in constructing an optical communication system which is capable of processing a signal light containing large volume information while maintaining an optical state thereof, without converting the signal light into electrical signals.

2. Description of the Related Art

In a photonic network in a metropolitan access area, a network configuration is frequently modified by the exchange of lines and signals and the switching of routes in an add/drop multiplexing (ADM) node or the like. In a repeating stage in the current network, there is often adopted a configuration in which an optical signal is once converted into an electrical signal and then is converted into an optical signal, to thereby perform the signal switching.

However, in years to come, it is predicted that such an add/drop multiplexing node will be replaced by a dynamic optical add/drop multiplexing (OADM) node which separates only a desired wavelength while maintaining a state of optical signal, an optical cross connecting (OXC) node which performs the switching of input and output routes in a wavelength basis while maintaining a state of optical signal or the like. Further, in the further next generation, it is anticipated that, in order to improve the line usage efficiency, it would be necessary to prepare a function of dividing optical signals into fixed length frames, to perform the processing of the signal exchange and of the route switching (hereunder, to be referred generically to as the optical burst signal processing) in the frame basis while maintaining a state of optical signal.

As one of important optical components necessary for realizing the above, there is an optical switch which includes a plurality of input ports and a plurality of output ports. As one example of a conventional multi-input and multi-output port type optical switch, literatures 1 to 6 shown in the followings each discloses a technology relating to an optical switch module using optical deflection elements.

Literature 1: Japanese Unexamined Patent Publication No. 2002-318398

Literature 2: Japanese Unexamined Patent Publication No. 2003-185984

Literature 3: Japanese Unexamined Patent Publication No. 2000-114629

Literature 4: Japanese Unexamined Patent Publication No. 2002-269892

Literature 5: Japanese Unexamined Patent Publication No. 7-212315

Literature 6: Japanese Unexamined Patent Publication No. 10-228007

To be specific, as shown in FIG. 5 for example, the conventional optical switch module using the optical deflection elements comprises an incident side optical waveguide section 101, a collimating section 102, an incident side optical deflection element section 103, a common optical waveguide 104, an emission side optical deflection element section 105, a collecting section 106 and an emission side optical waveguide section 107. In the optical switch module 100 of such a configuration, for example in the case of switching a route of a signal light given to one end of an optical waveguide $101a\text{-}i$ ($i=1, 2, \ldots, n$), which corresponds to an input port #$1i$, in the incident side optical waveguide section 101, to an optical waveguide $107a\text{-}j$ ($j=1, 2, \ldots, n$), which corresponds to an output port #$2j$, in the emission side optical waveguide section 107, the signal light emitted from the other end of the optical waveguide $101a\text{-}i$ is converted into a parallel light in a collimator $102a\text{-}i$ to be given to an incident side optical deflection element $103a\text{-}i$. To the incident side optical deflection element $103a\text{-}i$, a voltage according to a position of the optical waveguide $107a\text{-}j$ being the output determination is applied from a control circuit (not shown in the figure), so that a traveling direction of the signal light from the collimator $102a\text{-}i$ is deflected. Then, the signal light polarized by the incident side optical deflection element $103a\text{-}i$ travels straight through a free space in the common optical waveguide 104 to reach an emission side optical deflection element $105a\text{-}j$. In the emission side deflection element $105a\text{-}j$, the traveling direction of the signal light is deflected according to a position of a collective lens $106a\text{-}j$ by the voltage application from the control circuit, so that the signal light is collected by the collective lens $106a\text{-}j$ to be given to the optical waveguide $107a\text{-}j$. As a result, the route of the signal light given to the input port #$1i$ is switched to the output port #$2j$.

Incidentally, herein, the configuration using the optical deflection elements is shown as one example of multi-output ports type optical switch. However, other than such a configuration, there is also known, for example, the configuration utilizing a semiconductor optical amplifier (SOA), a micro electro mechanical system (MEMS) mirror or the like.

In an apparatus for performing the optical burst signal processing utilizing the conventional optical switch module as described above, when the exchange of signal lights and the route switching in the frame basis are to be realized, since it is required to perform the switching processing at least at a time dimension (for example, a microsecond dimension) smaller than a millisecond dimension, the route switching needs to be performed sequentially on the frame signal lights input from the various routes. However, there is caused a problem in that, when such processing is performed, there may be an influence by a difference in input power to the optical switch module, a loss difference between the input and output ports of the optical switch module or the like, so that a variation occurs in output power values of the output frame signal lights, thereby affecting the performance of error-free reception in an optical receiver.

In order to solve the problem relating to the optical switch module control in the optical burst signal processing as described above, the applicant of the present invention has proposed an optical switching device of a configuration as shown in FIG. 6 for example (refer to Japanese Patent Application No. 2005-102763). In the optical switching device according to the invention in this prior application, a reference light Lb whose wavelength is set to be outside a wavelength band of a signal light Ls which is given to each of input ports #11 to #1n of an optical switch module 100, is given from a reference light source 111 to each of the input ports of the optical switch module 100 via each of wavelength multiplexing couplers 112-1 to 112-n, and the reference light Lb contained in the light output from each of output ports of the optical switch module 100 is extracted by each of wavelength separating couplers 113-1 to 113-n, so that the power thereof is monitored by a reference light power monitor 114. Thereby, a loss in the optical switch module 100 is monitored and the monitoring result is stored in a control circuit 115. Then, when a route setting control and a variable attenuating control are performed on the input signal light, a control parameter for the optical switch module 100 is calculated based on the stored information and the input signal light power monitored by an input signal light power monitor 110, so that the optical switch module 100 is controlled in accordance with the control parameter. As a result, a power variation in the frame signal lights output from respective output ports #21 to #2n is suppressed.

The invention in the prior application as described above is significantly effective as a specific optical switch control technology for resolving the variation in output optical power in the optical burst signal processing at the time dimension smaller than the millisecond dimension. However, even in this invention in the prior application, there remains a problem as shown in the following which is caused by the wavelength dependence of the optical switch module.

Namely, in the device configuration shown in FIG. 6, the propagation direction of the signal light Ls (solid lined arrow in the figure) is same as the propagation direction of the reference light Lb used for grasping the characteristic of the optical switch module 100. Therefore, in order to prevent the reference light Lb from not entering into the output light of the optical switching device, it is required that the wavelength of the reference light Lb is set to be outside the wavelength band of the signal light Ls, to be separated from the signal light Ls by the wavelength separating coupler 113. Therefore, in the case where the characteristic of the optical switch module 100 includes the wavelength dependence, there is a problem in that an error occurs in the information (calibration data) obtained by using the reference light Lb whose wavelength is different from that of the signal light Ls.

Incidentally, in the specification of the prior application, there is disclosed one example in which a correspondence relationship between a power characteristic of the monitored reference light and a power characteristic of the signal light is previously stored in order to correct the error due to the difference between the wavelength of the signal light and that of the reference signal. However, it is difficult to perform the error correction with sufficient precision in the case where the characteristic of the optical switch module 100 is changed due to, for example, the temperature variation, the degradation with time or the like. Further, there is disclosed the case where the reference light Lb whose wavelength is same as that of the signal light Ls is supplied. However, in this case, it is necessary to dispose separately an optical switch for switching the supply determination of the reference light Lb according to whether or not the optical route is set, and also a high-speed operation at least at a time dimension smaller than the millisecond dimension is required for such an optical switch. Therefore, the configuration becomes complicated and also the cost thereof rises.

Further, in the device configuration shown in FIG. 6, the relatively large loss occurs in the optical switch module 100, but this loss is not compensated in the optical switching device. Although it becomes possible to compensate for the loss as described above by disposing an optical amplifier in the optical switching device, a transient response in the optical amplifier becomes problematic only by simply disposing the optical amplifier. To be specific, as shown in FIG. 7 for example, if the burst signal light of waveform as shown in the lower left of the figure is input to the optical amplifier disposed in the optical switching device, at the rising time of the burst signal light, a surge as shown in the lower right of the figure occurs in the output waveform of the signal light amplified by the optical amplifier, to adversely affect on the various devices connected to the downstream of the optical switching device. Therefore, the loss compensation considering the transient response of the optical amplifier is the subject to be solved.

SUMMARY OF THE INVENTION

The present invention has been accomplished in view of the above problems and has an object to provide an optical switching device capable of, even in the case where an optical switch module has the wavelength dependence, performing the setting and switching of optical routes by accurately grasping a characteristic relating to a loss in the optical switch module, and also of compensating for the loss in the optical switch module while suppressing the waveform degradation of an output signal light to the minimum.

In order to achieve the above object, an optical switching device according to the present invention which includes: a plurality of input ports and a plurality of output ports; a plurality of input light paths through which signal lights input via the input ports are propagated in one direction; a plurality of output light paths through which the signal lights to be output to the output ports are propagated in one direction; and an optical switch module which sets optical routes capable to be switched between the input light paths and the output light paths, comprises: a reference light generating section that generates a wavelength-variable reference light in a wavelength band of the signal light input from each of the input ports; a plurality of reference light supply sections that is disposed on each of the output light paths, to transmit the signal light which is propagated through each of the output light paths in one direction and also to give the reference light output from the reference light generating section to each of the output light paths in a direction inverse to a propagation direction of the signal light; a plurality of optical amplifiers which is disposed on each of the optical output paths positioned between the optical switch module and the reference light supply sections; a plurality of reference light separating sections that is disposed on each of the input light paths, to transmit the signal light which is propagated through each of the input light paths in one direction and also to extract the reference light which passes through the optical switch module to be propagated through each of the input light paths in the direction inverse to the propagation direction of the signal light; a reference light power monitor which monitors the power of the reference light extracted by each of the reference light separating section; and a control circuit which acquires data relating to a loss in the optical switch module using the monitoring result by the reference light power monitor, to control the optical switch module in accordance with a control parameter which is corrected based on the acquired data.

In the optical switching device of the above configuration, the reference light within the signal light wavelength band output from the reference light generating section, is given to each of the output light paths by each of the reference light supply sections, and is propagated through each of the output light paths in the direction inverse to the propagation direction of the signal light, and passes through each of the optical amplifiers to be sent to the optical switch module. The reference light supplied to the optical switch module is led to the pertinent input light path in accordance with the set optical route, and is separated from the pertinent input light path by the reference light separating section disposed on the pertinent input light path, to be sent to the reference light power monitor. In the reference light power monitor, the power of the reference light from each of the reference light separating sections is monitored, and the monitoring result thereof is transmitted to the control circuit, so that the data relating to the loss in the optical switch module is acquired. Then, the control circuit corrects the control parameter for the optical switch module based on the acquired data, to control the optical switch module in accordance with the control parameter after corrected.

According to the optical switching device of the present invention, the reference light is given to the optical switch module in the direction inverse to the propagation direction of the signal light, so that the loss in the optical switch module can be monitored using the reference light whose wavelength is set to be within the wavelength band of the input signal light. Thus, it becomes possible to acquire the loss data in which an error due to the wavelength dependence of the optical switch module is reduced. Then, the control parameter for the optical switch module is corrected based on the loss data, so that a variation in the power of the signal light output from each of the output ports can be suppressed. Further, since the reference light is supplied to each of the optical amplifiers irrespective of a generation state of the signal light, it becomes possible to perform the loss compensation of the optical switch module while suppressing a transient response of each of the optical amplifiers at the rising time of the signal light.

The other objects, features and advantages of the present invention will be apparent from the following description of the embodiments with reference to the accompanying drawings.

DETAILED DESCRIPTION OF THE INVENTION

Figure 1:
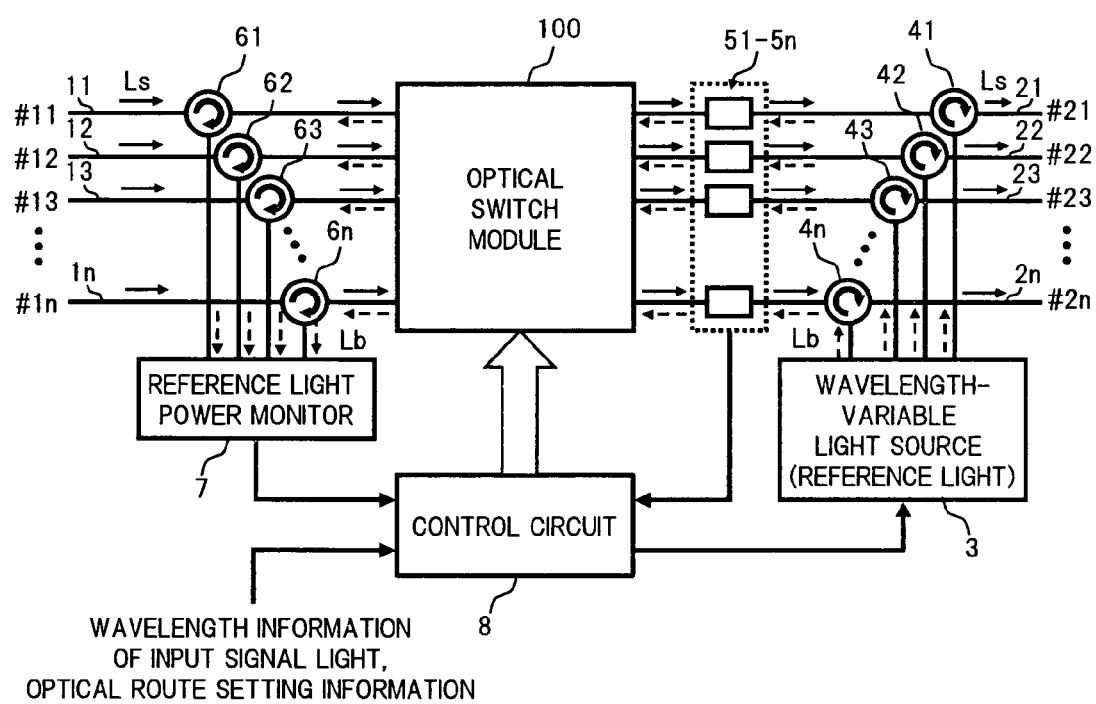
FIG. 1 is a block diagram showing a configuration of one embodiment of an optical switching device according to the present invention.

Hereinafter, embodiments of the present invention will be described with reference to drawings. The same reference numerals denote the same or equivalent parts in all drawings.

FIG. 1 is a block diagram showing a configuration of one embodiment of an optical switching device according to the present invention.

Figure 5:
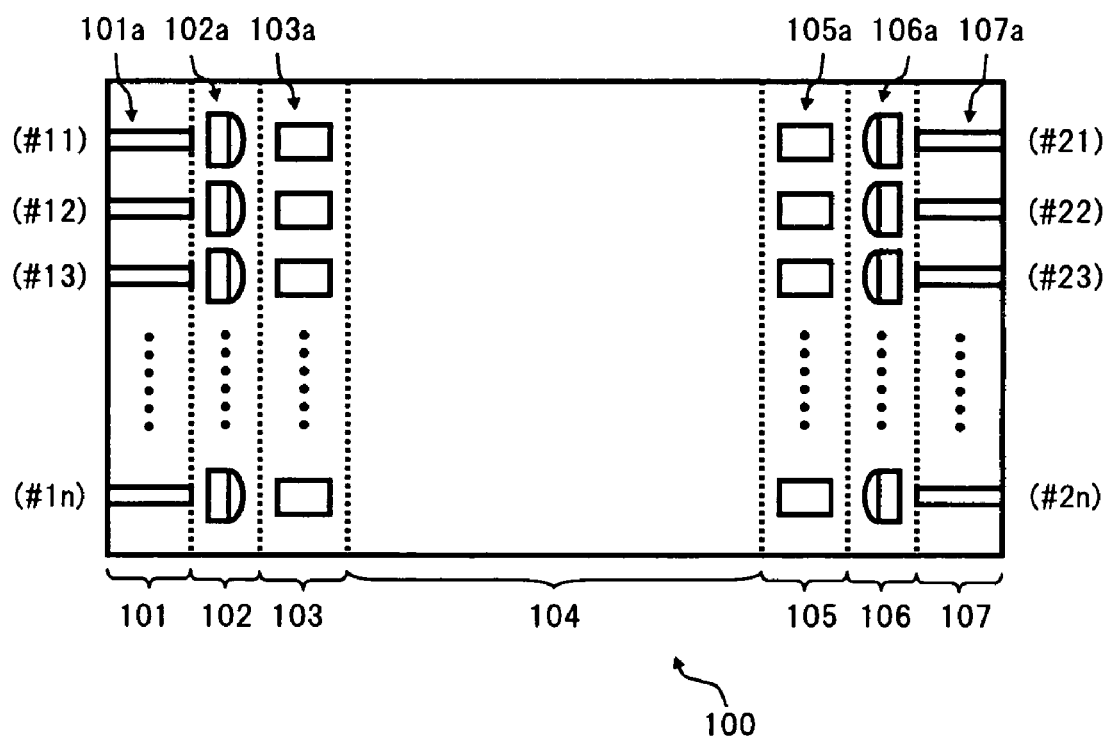
FIG. 5 is a diagram showing one example of a conventional optical switch module which uses optical deflection elements.
Figure 6:
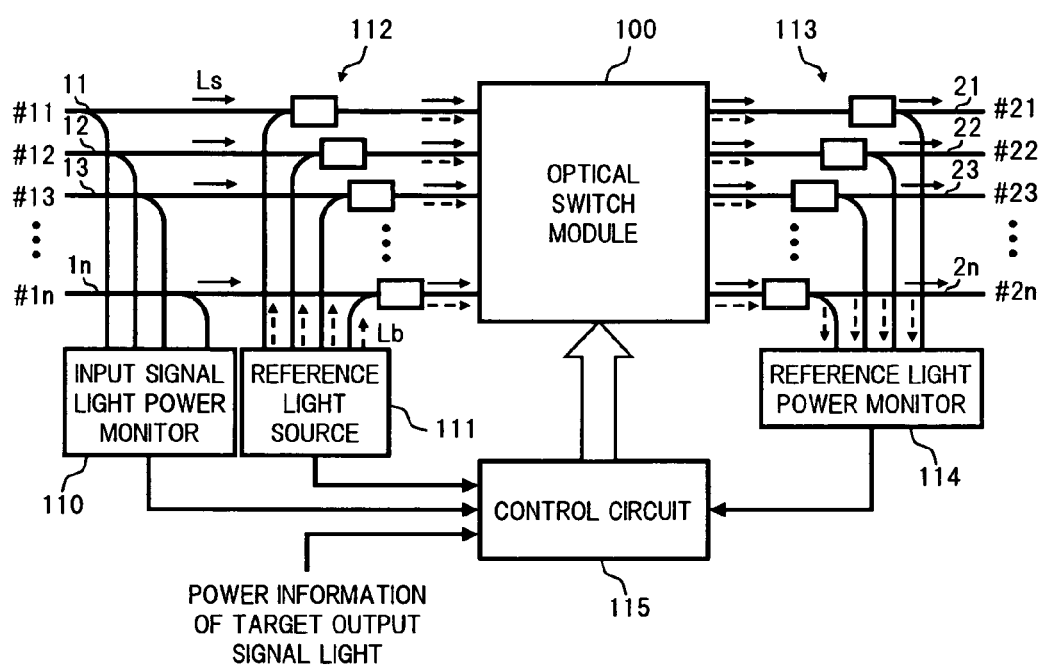
FIG. 6 is a diagram showing a configuration of an optical switching device according to the invention of a prior application.

In FIG. 1, the present optical switching device comprises, for example; input ports #11 to #1n and output ports #21 to #2n; an optical switch module 100 using optical deflection elements as shown in FIG. 5; input light paths 11, 12, . . . , 1n which connect the input ports #11 to #1n to respective input ports of the optical switch module 100; and output light paths 21, 22, . . . , 2n which connect the output ports #21 to #2n to respective output ports of the optical switch module 100. Further, the present optical switching device comprises: a wavelength-variable light source 3 serving as a reference light generating section, which generates a reference light Lb; output side optical circulators 41, 42, . . . , 4n serving as reference light supply sections, each of which is disposed on each of the output light paths 21 to 2n, to give the reference light Lb output from the wavelength-variable light source 3 to the pertinent output light path in a direction inverse to a propagation direction of a signal light Ls; optical amplifiers 51, 52, . . . , 5n disposed on the respective output light paths 21 to 2n between the optical switch module 100 and the output side optical circulators 41 to 4n; input side optical circulators 61, 62, . . . , 6n serving as reference light separating sections, each of which is disposed on each of the input light paths 11 to 1n, to extract the reference light Lb which passes through the optical switch module 100 to be output to each of the input light paths 11 to 1n; a reference light power monitor 7 which monitors the power of the reference light Lb extracted by each of the input side optical circulators 61 to 6n; and a control circuit which controls the optical switch module 100 based on the monitoring result by the reference light power monitor 7.

The optical switch module 100 controls a deflection angle of the signal light in each of input side and output side optical deflection elements, to perform the setting and switching of optical routes between the input and output ports thereof. In this optical switch module 100, characteristics of the optical deflection elements or the like are changed due to the wavelength of the signal light Ls, so that the power of the signal light led to the output port (a loss relative to the signal light) exhibits the wavelength dependence. However, a propagation characteristic from the input port to the output port is same as a propagation characteristic from the output port to the input port irrespectively of the wavelength of the light, namely, the optical switch module does not have directional properties.

As a specific example of the optical switch module 100 exhibiting the above characteristics, there is the one in which a crystal material having an electro-optic effect, such as PLZT $(Pb_{1-x}La_x(Z_yT_{1-y})_{1-x/4}O_3)$ or the like, is used, and electrodes are disposed on a top surface and a bottom surface of the crystal material so as to face with each other, to thereby form the optical deflection elements. Note, the configuration of the optical switch to which the present invention is applied is not limited to the above specific example, and it is possible to apply the present invention to the known optical switch capable of performing the high-speed response, other than the configuration using the optical deflection elements.

The wavelength-variable light source 3 is a typical wavelength-variable light source capable of arbitrarily setting a wavelength of the reference light Lb to be within a wavelength band of the signal light Ls input to the optical switch module 100. This wavelength-variable light source 3 determines the wavelength of the reference light Lb to be given to each of the output light paths 21 to 2n via each of the output side optical circulators 41 to 4n, in accordance with input signal light wavelength information transmitted from the control circuit 8. The wavelength of the reference light Lb to be given onto each of the output light paths 21 to 2n is desirable to be set same as or in the vicinity of a wavelength of the signal light led to each of the output ports of the optical switch module 100.

As a specific example of the wavelength-variable light source 3, a commercially available wavelength-variable light source (for example, the product by SANTEC CORPORATION) may be used, or a commercially available broadband SLED (for example, the product by DenseLight Semiconductors Pte. Ltd.) and a wavelength-variable filter (for example, the product by SANTEC CORPORATION) may be combined to be used. In the case where the combination of the broadband SLED and the wavelength-variable filter is used, since there is a possibility that the reference light power cannot exhibit the sufficient power as an assist light to be described later, at such a time, it is preferable to dispose an optical amplifier for amplifying an output light from the wavelength-variable filter. Note, the configuration of the wavelength-variable light source to be used in the present invention is not limited to the above specific example.

The output side optical circulators 41 to 4*n* each including three ports of a first port, a second port and a third port, outputs the light input to the first port to the second port, outputs the light input to the second port to the third port and outputs the light input to the third port to the first port. Herein, the first ports of the output side optical circulators 41 to 4*n* are connected to an output port of the wavelength-variable light source 3, the second ports thereof are connected to the output light paths 21 to 2*n* positioned on the side of the optical amplifiers 51 to 5*n*, and the third ports thereof are connected to the output light paths 21 to 2*n* positioned on the side of the output ports #21 to #2*n*.

The optical amplifiers 51 to 5*n* each amplifies the signal light Ls output from each of the output ports of the optical switch module 100 to give it to the second port of each of the output side optical circulators 41 to 4*n*, and also amplifies the reference light Lb output from the second port of each of the output side optical circulators 41 to 4*n* to give it to each of the output ports of the optical switch module 100. A gain of each of the optical amplifiers 51 to 5*n* is set at least at a value capable of compensating for the loss in the optical switch module 100. Further, the optical amplifiers 51 to 5*n* each has a function of outputting information relating to the power of the reference light Lb after amplified to the control circuit 8. Incidentally, in many cases, a typical optical amplifier is arranged with optical isolators at input and output ends thereof in order to prevent an adverse affect due to a reflected light. However, in the optical amplifiers 51 to 5*n* used in the present embodiment, basically, any optical isolators are not disposed on input and output ends thereof, since the function equivalent to the optical isolator is realized by the input side optical circulators 61 to 6*n* and the output side optical circulators 41 to 4*n*.

The input side optical circulators 61 to 6*n* each including three ports of a first port a second port and a third port, outputs the light input to the first port to the second port, outputs the light input to the second port to the third port and outputs the light input to the third port to the first port. Herein, the first ports of the input side optical circulators 61 to 6*n* are connected to the input light paths 11 to 1*n* positioned on the side of the input ports #11 to #1*n*, the second ports thereof are connected to the input light paths 11 to 1*n* positioned on the side of the optical switch module 100, and the third ports thereof are connected to an input port of the reference light power monitor 7.

The reference light power monitor 7 monitors the power of the reference light Lb output from the third port of each of the input side optical circulators 61 to 6*n*, to output a signal indicating the monitoring result to the control circuit 8.

The control circuit 8 receives the information relating to the optical routes to be set between the input light paths 11 to 1*n* and the output light paths 21 to 2*n*, to perform a control for setting the optical routes on the optical switch module 100. This control circuit 8 has a function of storing and updating a relationship between the optical route setting and controlled variable for the optical switch module 100, and output information from the optical amplifiers 51 to 5*n* and the reference light power monitor 7 is used for performing the storage and update processing.

Next, there will be described an operation of the present embodiment.

In the optical switching device of the above configuration, for example, in both of an initial state before the optical burst signal processing is started and of an operating state after the optical burst signal processing is started, calibration data using the reference light Lb is acquired and updated.

To be specific, the explanation is made on an acquiring operation of the calibration data using the reference light Lb in the initial state. Firstly, the wavelength information of the signal lights Ls to be input to the input ports #11 to #1*n* of the optical switching device is given to the wavelength-variable light source 3 from the control circuit 8. In the wavelength-variable light source 3, the reference light Lb having the wavelength same as or in the vicinity of the wavelength of one of the signal lights Ls, which is capable of passing through the optical switch module 100 to be led to the output light path 21, is output to the output side optical circulator 41. In the output side optical circulator 41, the reference light Lb from the wavelength-variable light source 3, which is input to the first port thereof, is output from the second port thereof to be sent to the optical amplifier 51. In the optical amplifier 51, the reference light Lb from the output side optical circulator 41 is amplified by a required gain to be given to the pertinent output port of the optical switch module 100, and the signal indicating the power of the reference light Lb is output to the control circuit 8.

In the optical switch module 100 to which the reference light Lb from the optical amplifier 51 is given via the pertinent output port thereof, at first, an applied voltage for optical deflection elements 103*a* and 105*a* (refer to FIG. 5) is initially set so that the optical route is formed between the pertinent output port thereof and the input port connected to the input light path 11. As a result, the reference light Lb is led to the input light path 11 to be sent to the input side optical circulator 61. In the input side optical circulator 61, the reference light Lb from the optical switch module 100, which is input to the second port thereof, is output from the third port thereof to be sent to the reference light power monitor 7. In the reference light power monitor 7, the power of the reference light Lb from the input side optical circulator 61 is monitored, and the signal indicating the monitoring result is output to the control circuit 8. In the control circuit 8, the loss in the optical switch module 100 is calculated, using the input power of the reference light Lb, which is transmitted from the optical amplifier 51, and the output power of the reference light Lb, which is transmitted from the reference light power monitor 7, and the calculation result is stored so as to correspond to the wavelength of the reference light Lb and the optical route setting thereof.

When the loss for when the optical route is set between the output light path 21 and the input light path 11 is stored in the control circuit 8, next, the optical route is switched to be set between the output light path 21 and the input light path 12, and similarly to the above, the power of the reference light Lb which passes through the optical switch module, 100 to be led to the input light path 12 is monitored by the reference light power monitor 7, so that the processing of calculation and storage of the loss in the optical switch module 100 is performed by the control circuit 8. Subsequently, the calculation and storage processing of the loss is repetitively performed, for when the optical routes are set sequentially between the output light path 21 and the input light paths 13 to 1*n*. When all of loss data between the output light path 21 and the input light paths 11 to 1*n* is acquired, further, the wavelength of the reference light Lb output to the output side optical circulator 41 from the wavelength-variable light source 3 is set so as to correspond to the wavelength of another signal light Ls which is capable to be led to the output light path 21, and the calculation and storage processing of the loss is repetitively performed, for when the optical routes are set sequentially between the output light path 21 and the input light paths 11 to 1n.

When the calculation and storage processing of the loss in the optical switch module 100 is completed for the combinations of all of the wavelengths of the signal light Ls which is capable to be led to the output light path 21 and all of the optical route setting between the output light path 21 and the input light paths 11 to 1n, next, the supply destination of the reference light Lb from the wavelength-variable light source 3 is changed to the output light path 22, and similarly to the above, the calculation and storage processing of the loss in the optical switch module 100 is performed for the combinations of all of the wavelengths of the signal light Ls which is capable to be led to the output light path 22 and all of the optical route setting between the output light path 22 and the input light paths 11 to 1n. Subsequently, the calculation and storage processing of the loss in the optical switch module 100 is repetitively performed in sequence, corresponding to other output light paths 23 to 2n. Then, the loss data in all conditions is stored in the control circuit 8, so that the storage information thereof is referred to at the operating time, as the calibration data in the initial state.

Next, there will be described an operation of the optical switching device in the operating state where the optical burst signal processing is executed.

In the operating state, the wavelength information of the signal light Ls input to each of the input ports #11 to #1n, the setting information of the optical route for the input signal light Ls and the like are given to the control circuit 8 through control channels set in a network to which the present optical switching device is applied. In the control circuit 8, a control parameter for the optical switch module 100 is calculated so that the optical routes are set between the input light paths 11 to 1n and the output light paths 21 to 2n in accordance with the optical route setting information. This calculation processing of the control parameter is performed such that the calibration data stored in the control circuit 8 is referred, to thereby judge the loss in the optical switch module 100 corresponding to the wavelength of the input signal light Ls and the optical route setting thereof, and based on the loss, the initial value of the applied voltage to the optical deflection elements 103a and 105a of the optical switch module 100 is corrected so that the power of the signal light Ls output from each of the output ports #21 to #2n becomes approximately uniform. Then, the optical switch module 100 is controlled by the control circuit 8 in accordance with the calculated control parameter, so that required optical routes are set between the input light paths 11 to 1n and the output light paths 21 to 2n in a state where the wavelength dependence of the optical switch module 100 is compensated.

Further, the control circuit 8 controls a driving condition of the wavelength-variable light source 3 in accordance with the wavelength information of the input signal light Ls and the optical route setting information thereof, so that the reference light Lb having the wavelength same as or in the vicinity of the wavelength of the signal light Ls which is output to each of the output light paths 21 to 2n from the optical switch module 100, is output to each of the output side optical circulators 41 to 4n from the wavelength-variable light source 3. As a result, the reference light Lb corresponding to the wavelength of the signal light Ls is supplied from the wavelength-variable light source 3 to each of the output light paths 21 to 2n via each of the output side optical circulators 41 to 4n, and the reference light Lb passes through each of the optical amplifiers 51 to 5n, to be sent to each of the output ports of the optical switch module 100.

Figure 2:
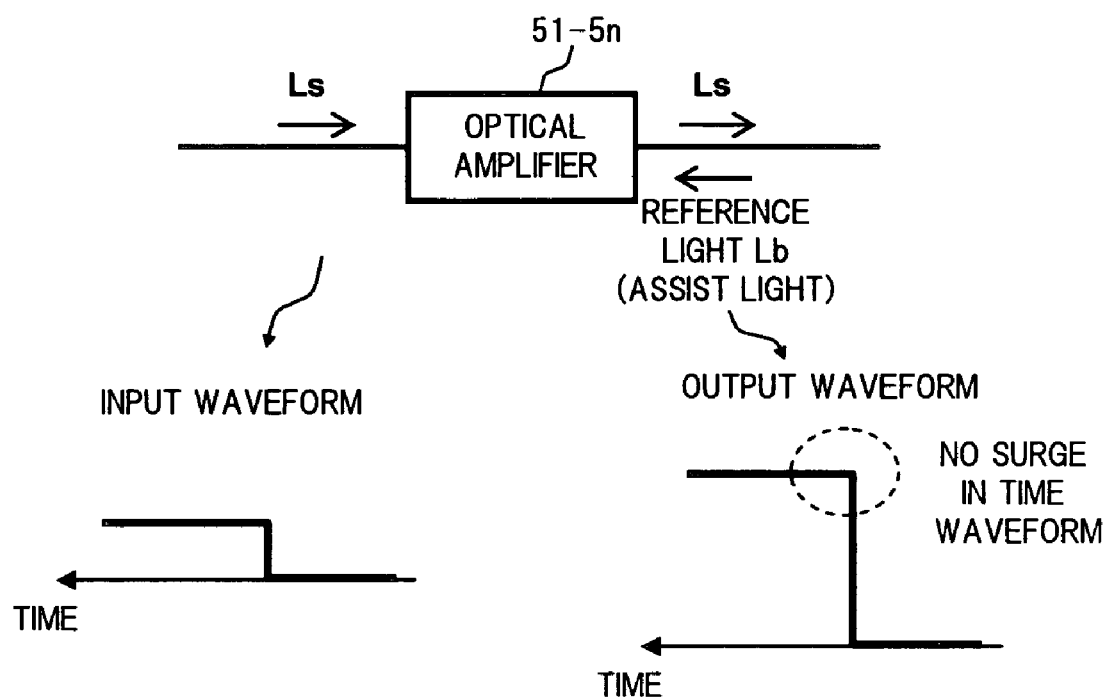
FIG. 2 is a diagram for explaining a surge suppression effect in the embodiment.
Figure 7:
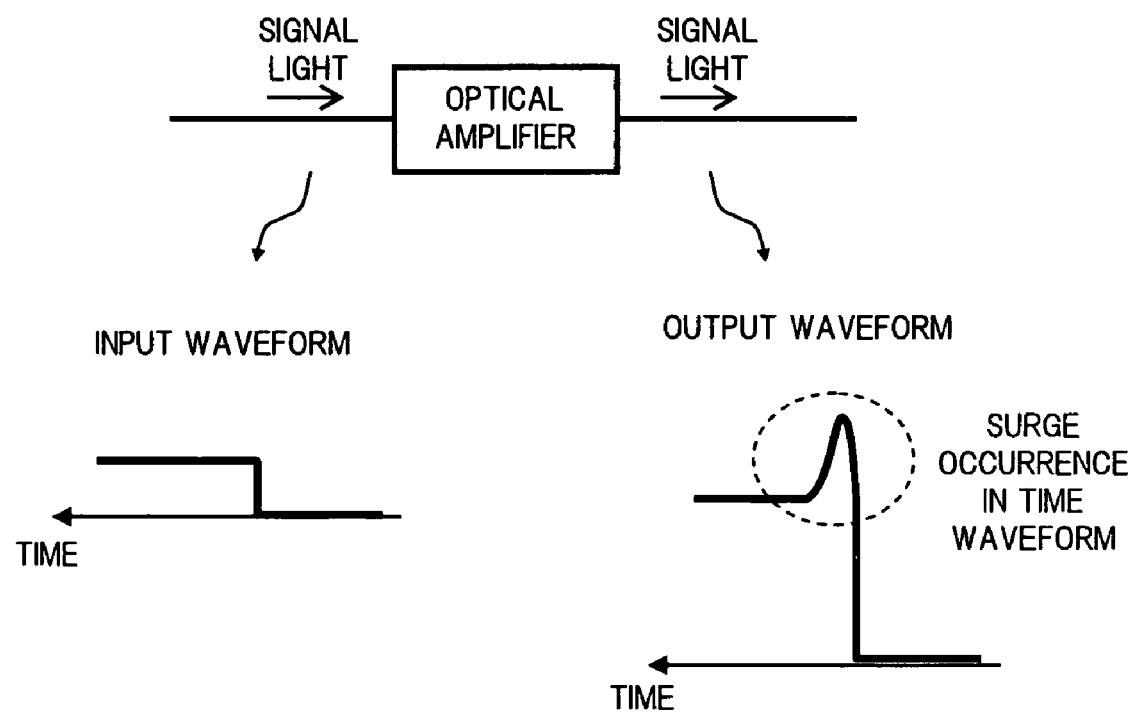
FIG. 7 is a diagram for explaining a transient response occurred when a burst signal light is amplified.

At that time, the reference light Lb is given to each of the optical amplifiers 51 to 5n via each of the output side optical circulators 41 to 4n, so that a transient response (surge occurrence) at the rising time of burst signal light shown in FIG. 7 is effectively suppressed. Explaining a surge suppression effect by the reference light Lb while referring to FIG. 2, when the reference light Lb is supplied to each of the optical amplifiers 51 to 5n each to which the burst signal light Ls is input, each of the optical amplifiers 51 to 5n continues to amplify the reference light Lb irrespective of the generation state of the burst signal light Ls. Therefore, even when the input of the burst signal light Ls is suspended resulting in an extinction state, the reference light Lb of the wavelength corresponding to that of the signal light Ls functions as the assist light, so that each of the optical amplifiers 51 to 5n is gain clamped and thus, the transient response at the rising time of the burst signal light Ls can be suppressed (refer to the lower right of FIG. 2).

Namely, according to the configuration of the present embodiment, it becomes possible to compensate for the loss in the optical switch module 100 by amplifying the signal light Ls passed through the optical switch module 100 by each of the optical amplifiers 51 to 5n, and also, to avoid the surge occurrence at the rising time of the signal light Ls by supplying the reference light Lb of the wavelength corresponding to that of the signal light Ls to each of the optical amplifiers 51 to 5n.

Incidentally, in the present embodiment, the wavelength of the reference light Lb is set to be same as or in the vicinity of the wavelength of the signal light Ls. However, since the gain clamping can be made by supplying the light within an amplification band of each of the optical amplifiers 51 to 5n as the assist light, if the wavelength of the reference light Lb is set at least within the wavelength band of the signal light Ls, it is possible to suppress the surge at the rising time of the signal light Ls. Therefore, in the case where the wavelength dependence of the optical switch module 100 is relatively less, the present invention effectively functions, if the wavelength of the reference light Lb is set to be within the wavelength band of the signal light Ls even though not set to be in the vicinity of the wavelength of the signal light Ls.

The reference light Lb which passes through each of the optical amplifiers 51 to 5n to be given to each of the output ports of the optical switch module 100, is propagated through the optical switch module 100 in the direction inverse to the propagation direction of the signal light Ls, to be led to the pertinent one of the input light paths 11 to 1n, in accordance with the optical route setting in the optical switch module.

At that time, if there is the one among the input ports #11 to #1n, which does not receive the signal light Ls and also the pertinent optical route thereof is not set in the optical switch module 100, for such unused input light path and unused output light path, the loss in the optical switch module is monitored using the reference light Lb, to thereby perform the update processing of the loss data stored in the control circuit 8, similarly to the acquiring operation of the calibration data in the initial state. In this update processing of the calibration data in the operating state, the unused input light path and the unused output light path being objects to be updated are changed serially following the optical route switching.

The calibration data is acquired and updated using the reference light Lb of the wavelength corresponding to the wavelength of the signal light Ls, and the optimization of the control parameter for the optical switch module 100 is performed based on the acquired and updated calibration data, as in the above manner. Thereby, after the signal light Ls input to each of the input ports #11 to #1n is led to the required one of the output light paths 21 to 2n, in the state where the wavelength dependence of the optical switch module is compensated and further, the loss in the optical switch module 100 is compensated in each of the optical amplifiers 51 to 5n, the signal light Ls whose power variation is suppressed is output from each of the output ports #21 to #2n via each of the output side optical circulators 41 to 4n.

As described in the above, according to the optical switching device in the present embodiment, the reference light Lb is given to the optical switch module 100 in the direction inverse to the propagation direction of the signal light Ls, so that the loss in the optical switch module 100 can be monitored using the reference light Lb of the wavelength same as or in the vicinity of the wavelength of the signal light Ls. Thus, it becomes possible to perform the calibration which is not affected by the wavelength dependence of the optical switch module 100, to thereby suppress the power variation in the signal light Ls output from each of the output ports #21 to #2n. Further, since the reference light Lb also serves as the assist light for gain clamping each of the optical amplifiers 51 to 5n, it is possible to compensate for the loss in the optical switch module 100 while suppressing the surge at the rising time of the burst signal light Ls. Moreover, the reference light Lb is supplied to each of the output light paths 21 to 2n by utilizing each of the output side optical circulators 41 to 4n, and also, the reference light Lb is extracted from each of the input light paths 11 to 1n by utilizing each of the input side optical circulators 61 to 6n, so that an affect by the reflected light can be prevented without the necessity of especially disposing optical isolators on the front and rear of each of the optical amplifiers 51 to 5n. Therefore, it becomes possible to provide the optical switching device of simple configuration with a low cost.

In the above embodiment, there has been shown the one example in which, for the control of the optical switch module by the control circuit 8, the control parameter is calculated referring to the calibration data which is acquired and updated using the reference light Lb, in the case of performing the setting and switching of the optical routes between the input light paths 11 to 1n and the output light paths 21 to 2n. However, the present invention is not limited to the above, and for example, in the case where a deflection angle of the optical switch module 100 after the optical route setting is finely adjusted to thereby realize a variable attenuating function of an output signal light (for the detail thereof, refer to Japanese Patent Application No. 2005-102763) or the like, the calculation of the control parameter may be performed referring to the calibration data.

Figure 3:
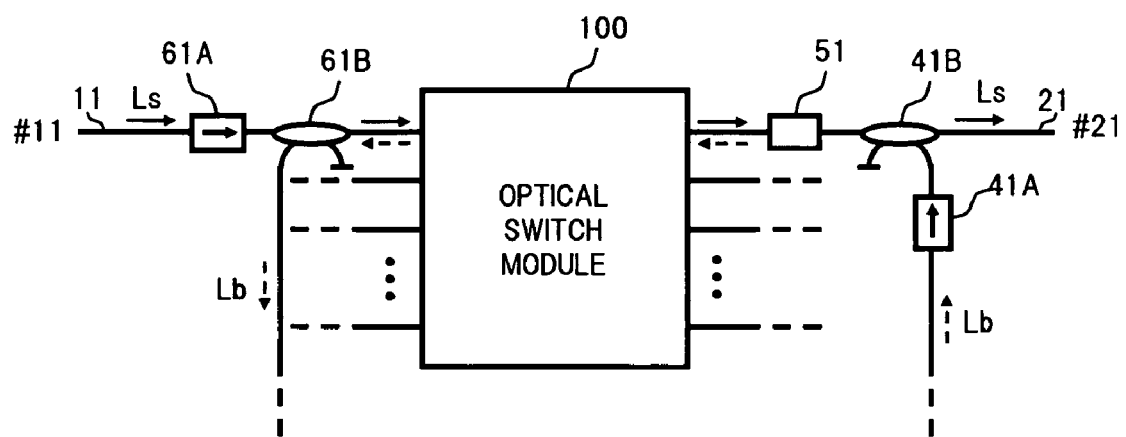
FIG. 3 is a diagram showing another configuration example in place of an optical circulator relating to the embodiment.

Further, in the above embodiment, there is shown the configuration example in which the supply of the reference light Lb to each of the output light paths 21 to 2n and the extraction of the reference light Lb from each of the input light paths 11 to 1n are performed by the optical circulators. However, as shown in FIG. 3 for example, an optical isolator 41A and an optical coupler 41B may be combined to be used in place of the output side optical circulator 41, and also, an optical isolator 61A and an optical coupler 61B may be combined to be used in place of the input side optical circulator 61. In this case, the reference light Lb output from the wavelength-variable light source 3 passes through the optical isolator 41A to be multiplexed onto the output light path 21 by the optical coupler 41B. On the other hand, the signal light Ls output from the optical amplifier 51 is branched into two by the optical coupler 41B, and one of the branched lights is output from the output port #21 while the other branched light is blocked by the optical isolator 41A from the propagation thereof to the side of the wavelength-variable light source 3. Note, in the case where an optical isolator is incorporated in the output port of the wavelength-variable light source 3, the above optical isolator 41A can be omitted. Further, the reference light Lb output to the input light path 11 from the optical switch module 100 is branched into two by the optical coupler 61B, and one of the branched lights is sent to the reference light power monitor 7 while the other branched light is blocked by the optical isolator 61A from the propagation thereof to the side of the input port #11. The input signal light Ls passes through the optical isolator 61A and through the optical coupler 61B, and is given to the optical switch module 100.

Figure 4:
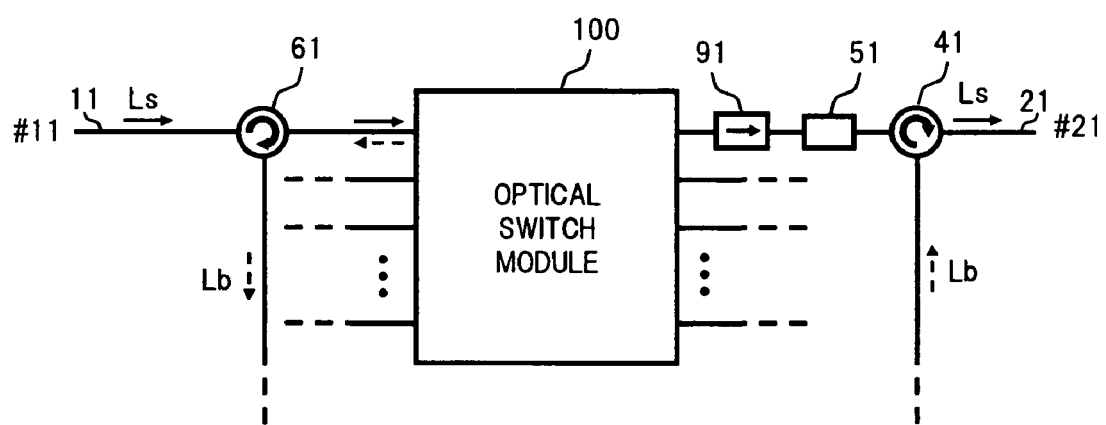
FIG. 4 is a diagram showing an application example in which an affect of reflection in the vicinity of an optical amplifier relating to the embodiment.

Moreover, in the above embodiment, the explanation is made provided that, generally, the function of each of the optical isolators disposed on the front and rear of the optical amplifier is realized by the input side and output side optical circulators 61 to 6n and 41 to 4n. However, in the case where the reflection of light in a portion existing between each of the input side optical circulators 61 to 6n and each of the optical amplifiers 51 to 5n, is relatively large, and therefore, has a possibility to have an adverse affect, such as the oscillation or the like, on each of the optical amplifiers 51 to 5n, as shown in FIG. 4 for example, there may be disposed between each of the output ports of the optical switch module 100 and each of the optical amplifiers 51 to 5n, an optical isolator 91 which does not substantially have a loss relative to the forward direction along which the signal light Ls is propagated and has low isolation (for example, 30 dB or less) relative to the inverse direction. Such an optical isolator of low isolation is not typical, but the designing thereof is easier than the commercially available optical isolator of high isolation, and therefore, the realization thereof is possible.

What is claimed is:

1. An optical switching device which includes:

a plurality of input ports and a plurality of output ports;

a plurality of input light paths through which signal lights input via said input ports are propagated in one direction;

a plurality of output light paths through which the signal lights to be output to said output ports are propagated in one direction; and an optical switch module which sets optical routes capable to be switched between said input light paths and said output light paths, comprising:

a reference light generating section that generates a wavelength-variable reference light within a wavelength band of the signal light input from each of said input ports;

a plurality of reference light supply sections that is disposed on each of said output light paths, to transmit the signal light which is propagated through each of said output light paths in one direction and also to give the reference light output from said reference light generating section to each of said output light paths in a direction inverse to a propagation direction of the signal light;

a plurality of optical amplifiers which is disposed on each of said optical output paths positioned between said optical switch module and each of said reference light supply sections;

a plurality of reference light separating sections that is disposed on each of said input light paths, to transmit the signal light which is propagated through each of said input light path in one direction and also to extract the reference light which passes through said optical switch module to be propagated through each of said input light paths in the direction inverse to the propagation direction of the signal light;

a reference light power monitor which monitors the power of the reference light extracted by each of said reference light separating section; and a control circuit which acquires data relating to a loss in said optical switch module using the monitoring result by said reference light power monitor, to control said optical switch module in accordance with a control parameter which is corrected based on said acquired data.

2. An optical switching device according to claim 1,
wherein said reference light generating section generates the reference light having a wavelength same as or in the vicinity of a wavelength of the signal light which is output to each of said output light paths from said optical switch module.

3. An optical switching device according to claim 1,
wherein said reference light supply sections each is provided with an output side optical circulator which includes a first port connected to an output end of said reference light generating section, a second port connected to said output light path positioned on the side of said optical amplifier and a third port connected to said output light path positioned on the side of said output port, and the output side optical circulator outputs to said second port the reference light input to said first port, and also outputs to said third port the signal light input to said second port, and said reference light separating sections each is provided with an input side optical circulator which includes a first port connected to said input light path positioned on the side of said input port, a second port connected to said input light path positioned on the side of said optical switch module and a third port connected to an input end of said reference light power monitor, and the input side optical circulator outputs to said second port the signal light input to said first port, and also outputs to said third port the reference light input to said second port.

4. An optical switching device according to claim 3,
wherein an optical isolator whose isolation relative to the light propagated in a direction inverse to the propagation direction of the signal light is 30 dB or less, is disposed on each of said output light paths positioned between said optical switch module and each of said optical amplifiers.

5. An optical switching device according to claim 1,
wherein said reference light supply section each is provided with: an optical coupler which includes a first input end connected to an output end of said reference light generating section, a second input end connected to said output light path positioned on the side of said optical amplifier and a first output end connected to said output light path positioned on the side of said output port; and an optical isolator inserted between the first input end of said optical coupler and the output end of said reference light generating section, and said reference light separating section each is provided with: an optical coupler which includes a first input end connected to said input light path positioned on the side of said input port, a first output end connected to said input light path positioned on the side of said optical switch module and a second output end connected to an input end of said reference light power monitor; and an optical isolator inserted between said input port and the first input end of said optical coupler.

6. An optical switching device according to claim 1,
wherein said reference light generating section generates the reference light having the power capable of gain clamping each of said optical amplifiers.

7. An optical switching device according to claim 1,
wherein said optical amplifiers each includes at least a gain capable of compensating for a loss in said optical switch module.

8. An optical switching device according to claim 1,
wherein said control circuit acquires to store the data relating to the loss in said optical switch module for all optical routes set between said input light paths and said output light paths, in an initial state before the signal light is input to each of said input ports, and in an operating state where the signal light is input to at least one of said input ports, acquires the data relating to the loss in said optical switch module for the optical route set between said input light path corresponding to said input port to which the signal light is not input, and said output light path, to update the data stored in the initial state.

9. An optical switching device according to claim 1,
wherein said control circuit corrects a control parameter for said optical switch module, based on the acquired data relating to the loss in said optical switch module, so that the power of the signal light output from each of said output ports becomes approximately uniform.

10. An optical switching device according to claim 1,
wherein said optical switch module includes a plurality of optical deflection elements corresponding to said input light paths and said output light paths, and performs the setting and switching said optical routes, by making said control circuit to control deflection angles of said optical deflection elements.

11. An optical switching device according to claim 1,
wherein said reference light generating section is configured using a wavelength-variable light source.

12. An optical switching device according to claim 1,
wherein said reference light generating section is configured using a broadband light source and a wavelength-variable filter.

* * * * *